US007189172B2

(12) United States Patent
Shahana et al.

(10) Patent No.: US 7,189,172 B2
(45) Date of Patent: Mar. 13, 2007

(54) REAR DERAILLEUR WITH A THREADED MEMBER FOR MOUNTING THE DERAILLEUR TO A BICYCLE FRAME

(75) Inventors: Satoshi Shahana, Osaka (JP); Nobukatsu Hara, Izumisano (JP)

(73) Assignee: Shimano, Inc., Sakai (JP)

( * ) Notice: Subject to any disclaimer, the term of this patent is extended or adjusted under 35 U.S.C. 154(b) by 377 days.

(21) Appl. No.: 10/707,430

(22) Filed: Dec. 12, 2003

(65) Prior Publication Data

US 2004/0116222 A1 Jun. 17, 2004

(30) Foreign Application Priority Data

Dec. 13, 2002 (JP) ............................. 2002-361852

(51) Int. Cl.
*F16H 61/00* (2006.01)

(52) U.S. Cl. ...................................................... 474/80

(58) Field of Classification Search .................. 474/78, 474/79, 80, 81, 82, 83
See application file for complete search history.

(56) References Cited

U.S. PATENT DOCUMENTS

| 2,108,941 | A | * | 2/1938 | Morgan | ........................ 474/80 |
| 3,111,855 | A | * | 11/1963 | Juy | ............................... 474/82 |
| 3,364,792 | A | | 1/1968 | Maeda | |
| 4,690,663 | A | * | 9/1987 | Nagano | ........................ 474/80 |
| 5,380,252 | A | | 1/1995 | Iwasaki et al. | |
| 5,494,307 | A | | 2/1996 | Anderson | |
| 5,498,211 | A | * | 3/1996 | Hsu | ............................. 474/80 |
| 5,919,106 | A | | 7/1999 | Ichida | |
| 5,931,753 | A | | 8/1999 | Ichida | |
| 6,287,228 | B1 | | 9/2001 | Ichida | |
| 6,350,212 | B1 | | 2/2002 | Campagnolo | |
| 2004/0254038 | A1 | * | 12/2004 | Chamberlain et al. | ....... 474/144 |

FOREIGN PATENT DOCUMENTS

| EP | 75927 A2 | 4/1983 |
| EP | 875444 A1 | 11/1998 |
| EP | 1099620 A2 | 5/2001 |

* cited by examiner

*Primary Examiner*—Vicky A. Johnson
(74) *Attorney, Agent, or Firm*—James A. Deland

(57) ABSTRACT

A derailleur comprises a base member including an engagement member for nonrotatably engaging the bicycle frame; a threaded member coupled to the base member for engaging a threaded shaft; a chain guide; and a coupling mechanism coupled between the base member and the chain guide so that the chain guide moves relative to the base member.

20 Claims, 8 Drawing Sheets

REAR DERAILLEUR WITH A THREADED MEMBER FOR MOUNTING THE DERAILLEUR TO A BICYCLE FRAME

BACKGROUND OF INVENTION

The present invention is directed to bicycles and, more particularly, to a bicycle derailleur that includes a threaded member for mounting the derailleur to a bicycle frame.

A bicycle rear derailleur engages a driving chain on one of a plurality of sprockets mounted on the rear wheel hub. A conventional derailleur comprises a base member detachably fastened to the back end the frame, a chain guide for guiding the chain onto the plurality of sprockets, a movable member that pivotably supports the chain guide, and a link mechanism that movably supports the movable member relative to the base member. Rear dropout portions are formed at the back end of the frame for installing the rear wheel hub and the rear derailleur. The base member sometimes is mounted to the rear wheel hub axle and secured by a nut that screws onto the hub axle. Such a derailleur is shown in laid-open Japanese Patent Publication No. H1-136, 888, for example.

The chain guide has a pair of vertically aligned pulleys that guide the chain onto one of the plurality of sprockets, wherein the chain guide is pivotably coupled to the moveable member so that the chain guide pivots around an axis that is substantially parallel to the hub axle. The chain guide is biased relative to the movable member in a direction that also produces tension on the chain (typically clockwise when viewed laterally outwardly from the derailleur). The link mechanism may comprise a four-point link mechanism having a pair of links that move the movable member in the direction of the hub axle and diametrically outwardly as the chain guide moves closer to the sprockets. The inner cable of a Bowden cable assembly is fastened to the link mechanism such that pulling or releasing the inner cable using a shifter disposed on the handlebar causes the link mechanism to move the movable member and chain guide to engage the chain with a desired sprocket.

SUMMARY OF INVENTION

The present invention is directed to various features of a bicycle derailleur. In one embodiment, the derailleur comprises a base member including an engagement member for nonrotatably engaging the bicycle frame; a threaded member coupled to the base member for engaging a threaded shaft; a chain guide; and a coupling mechanism coupled between the base member and the chain guide so that the chain guide moves relative to the base member. Additional inventive features will become apparent from the description below, and such features alone or in combination with the above features may form the basis of further inventions as recited in the claims and their equivalents.

DETAILED DESCRIPTION

Figure 1:
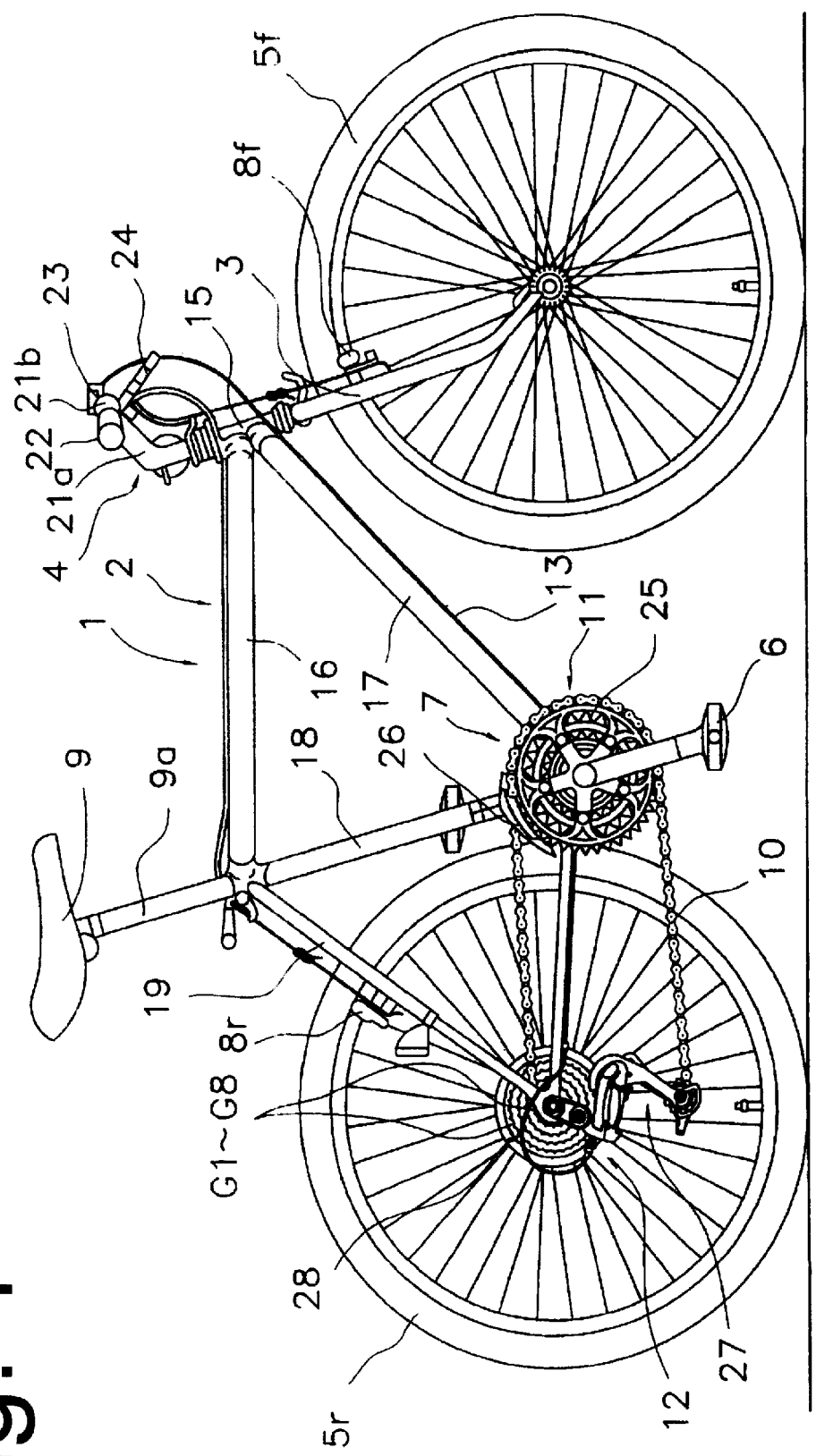
FIG. 1 is a side view of a particular embodiment of a bicycle.

FIG. 1 is a side view of a particular embodiment of a bicycle 1. Bicycle 1 includes a diamond-shaped frame body 2, a front fork 3, a handlebar unit 4, a front wheel 5f, a rear wheel 5r, a drive unit 7 for transferring rotation of pedals 6 to rear wheel 5r, a front brake unit 8f and a rear brake unit 8r.

Frame body 2 comprises front and rear triangular portions, wherein front triangular portion comprises a head tube 15, a top tube 16, a down tube 17, and a seat tube 18. Fork 3 is mounted to head tube 15 for rotation around an inclined axis. Handlebar unit 4 is mounted to the upper portion of fork 3, and front wheel 5f is rotatably mounted to the lower portion of fork 3. Handlebar unit 4 comprises a handle stem 21a and a handlebar 21b mounted to the top of handlebar stem 21a, wherein handle stem 21a is mounted to the top of front fork 3. Handlebar 21b is equipped with a pair of left and right grips 22, a pair of left and right shift control units 23, and a pair of left and right brake controllers 24. A vertically adjustable seat post 9a with a saddle 9 mounted thereon is mounted in the upper portion of seat tube 18, and a forward portion of drive unit 7 is rotatably mounted at the lower portion of seat tube 18.

Figure 3:
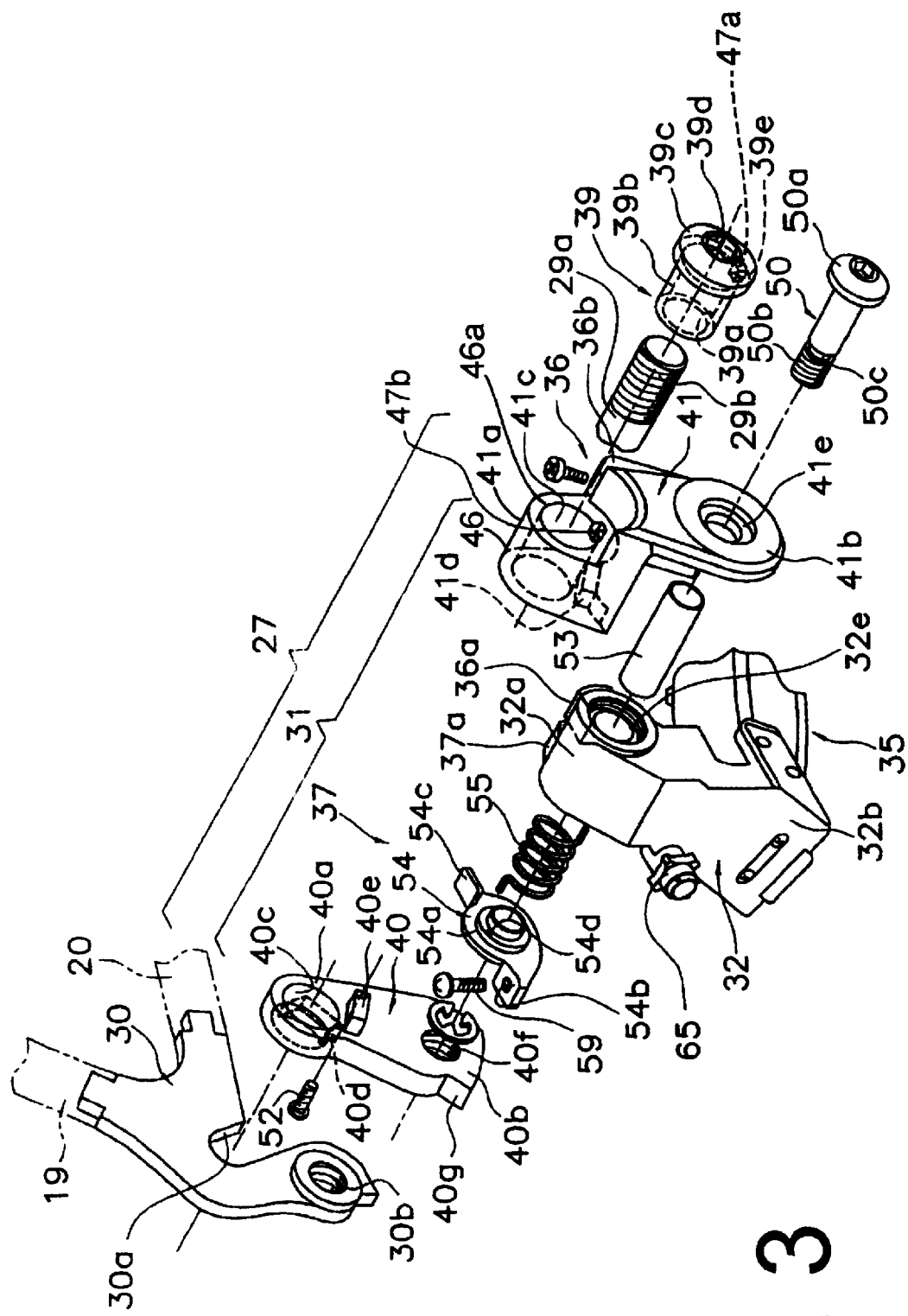
FIG. 3 is an exploded view of relevant components of the rear derailleur near the base member of the derailleur.
Figure 4:
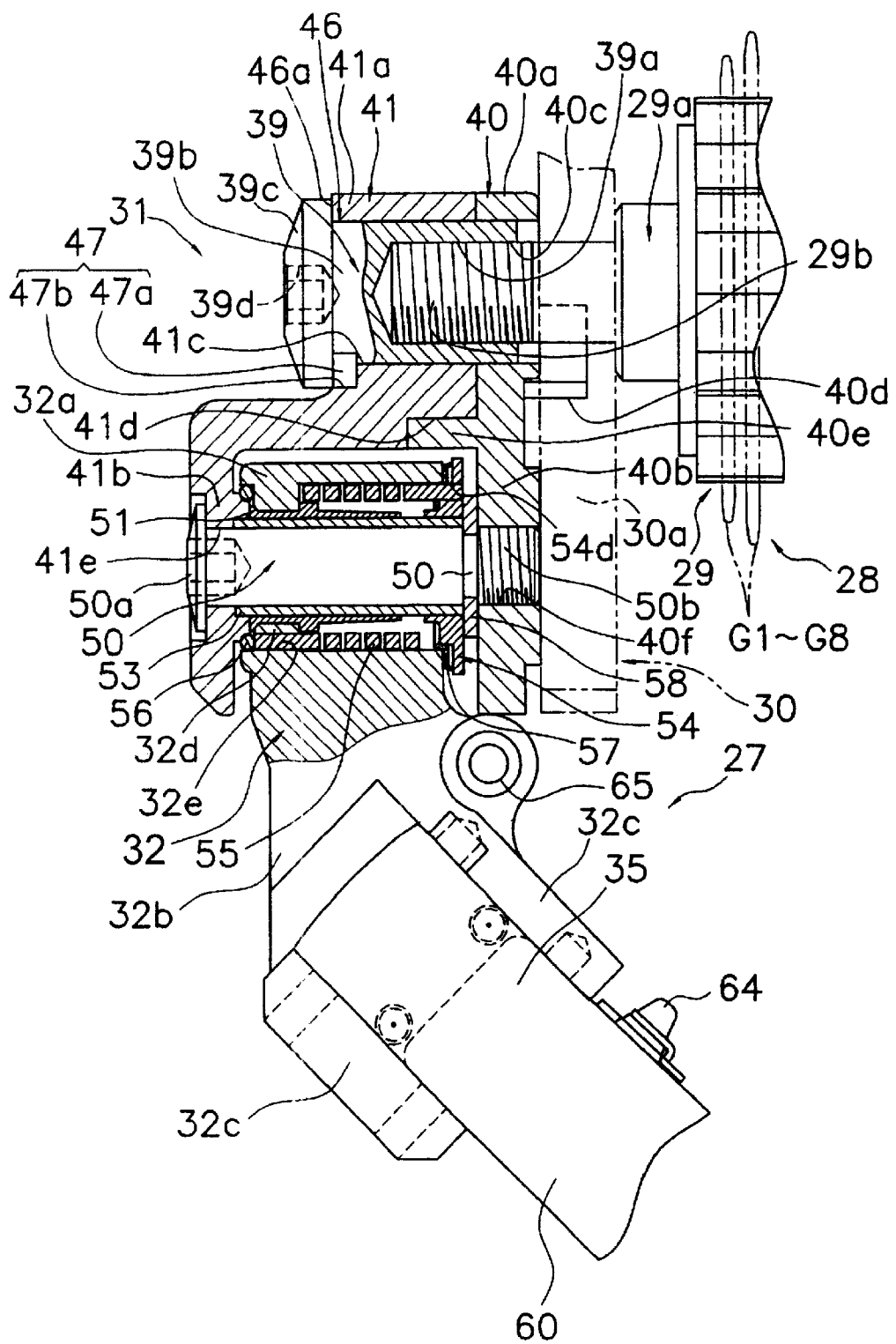
FIG. 4 is a partial cross sectional view of the components near the base member of the rear derailleur in an assembled condition.

The rear triangular portion of frame body 2 comprises seat tube 18, a pair of seatstays 19 and a pair of chainstays 20. The back ends of seatstays 19 and chainstays 20 are connected by rear dropout portions 30 (FIG. 3), and rear wheel 5r is mounted to these rear dropout portions 30. As shown in FIGS. 3 and 4, the right side rear dropout portion 30 includes a mounting slot 30a and a screw hole 30b. Mounting slot 30a typically is formed sloping diagonally upward from the bottom of rear dropout portion 30, and screw hole 30b typically is formed at the end of a projecting portion that projects diagonally downward from the back of rear dropout portion 30. Mounting slot 30a is used for installing the hub axle 29a of a rear hub 29 of rear wheel 5r, and screw hole 30b is used for mounting a derailleur 27. Derailleur 27 also is mounted to hub axle 29a. In order to prevent damage or deformation to other components of frame body 2, rear dropout portions 30 may be less rigid than other components and may be designed to be replaceable if damaged.

Drive portion 7 has a chain 10 and front and rear external gearshift devices 11 and 12. Front external gearshift device 11 is disposed at a bottom bracket portion of seat tube 18, and it includes a gear crank 25 and a front derailleur 26. Gear crank 25 may have a plurality of (e.g., three) sprockets with different numbers of teeth. Front derailleur 26 is operatively coupled to one of the shift control devices 23 through a shift cable assembly in the form of a Bowden cable (not shown), and front derailleur 26 engages the chain 10 with one of the three sprockets disposed on gear crank 5 in response to the operation of that shift control device 23.

Figure 2:
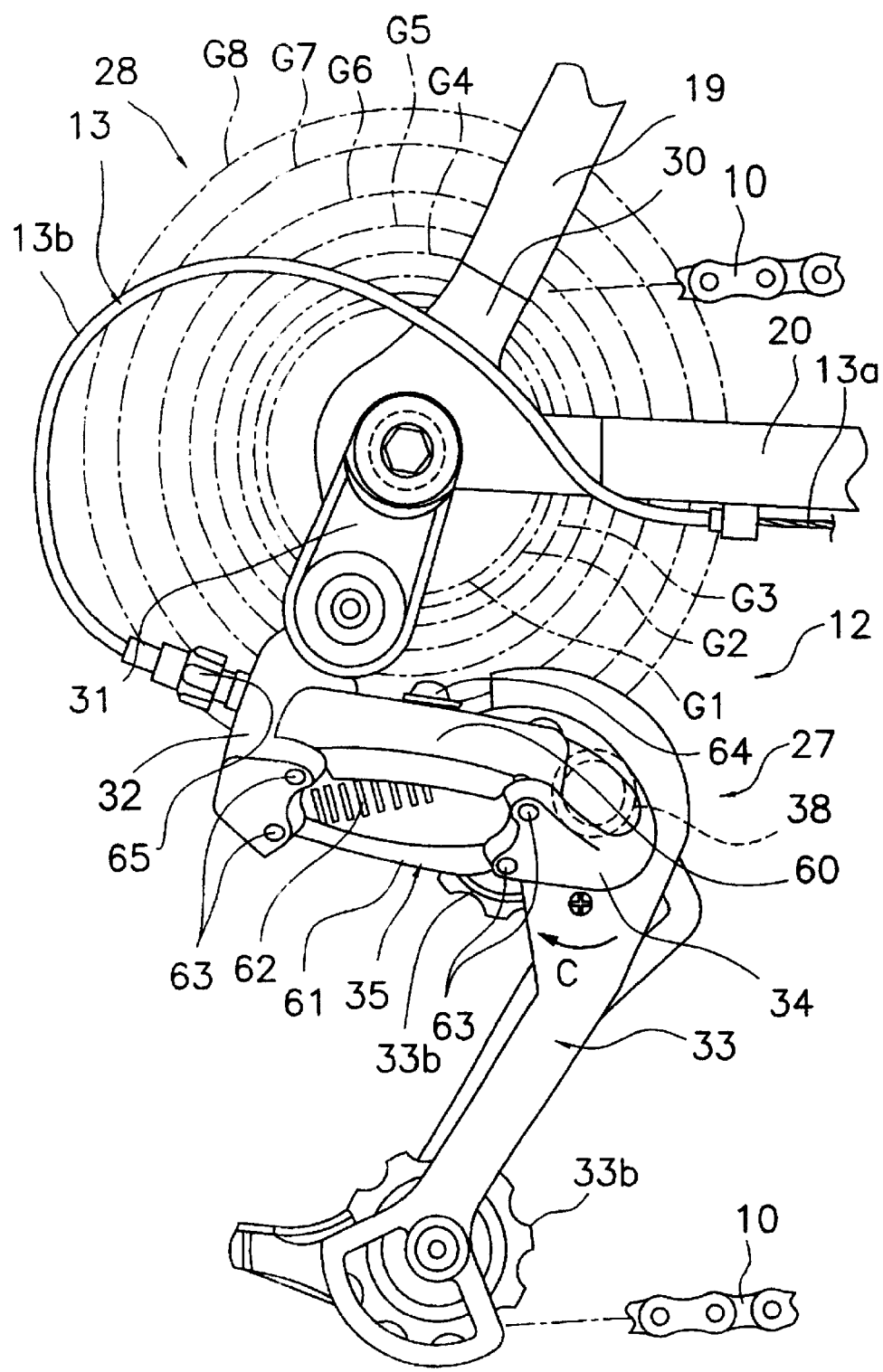
FIG. 2 is a more detailed side view of the rear derailleur.

As shown in FIGS. 1, 2 and 4, rear external gearshift device 12 has rear derailleur 27 and a gear cluster 28 comprising a plurality of (e.g., eight) sprockets G1–G8 with different numbers of teeth mounted on the rear hub 29. Rear derailleur 27 is operatively coupled to one of the shift control devices 23 through a shift cable assembly 13 in the form of a Bowden cable, and rear derailleur 27 engages the chain 10 with one of the sprockets G1–G8 in response to the operation of that shift control device 23.

As shown in FIGS. 2–6, rear derailleur 27 is detachably installed onto the right side rear dropout portion 30. The assembly comprises a base member in the form of a first base member body 31 fastened to the rear dropout portion 30, a second base member body 32 rotatably mounted on first base member body 31, a chain guide 33, a movable member 34, a coupling mechanism in the form of a link mechanism 35, and first and second rotation restricting mechanisms 36 and 37 for restricting the rotational movement of second base member body 32 relative to first base member body 31 in both rotational directions.

First base member body 31 is detachably fastened to hub axle 29a of rear wheel 5r disposed in the mounting slot 30a of rear dropout portion 30. First base member body 31 comprises a first bracket body 40 and a second bracket body 41, wherein second bracket body 41 is attached to first bracket body 40 by means of a screw 52. Brackets bodies 40 and 41 have first and second upper mounting portions 40a and 41a and first and second lower mounting portions 40b and 41b. First and second upper mounting portions 40a and 41a contact each other and are arranged to be disposed at mounting slot 30a, whereas first and second lower mounting portions 40b and 41b are spaced apart from each other for receiving second base member body 32 therebetween.

As shown in FIGS. 3 and 4, first bracket body 40 is a plate shaped member. Upper mounting portion 40a includes a through-hole 40c for receiving hub axle 29a therethrough, an engagement member in the form of a turnstop projection 40d formed on the surface facing dropout portion 30 for engaging mounting slot 30a in a simple manner, and a positioning projection 40e formed on the opposite surface for engaging second bracket body 41. Turnstop projection 40d is formed at the perimeter of through-hole 40c, and it has a width slightly smaller than the width of mounting slot 30a. Turnstop projection 40d prevents first base member body 31 from turning relative to rear dropout portion 30 when first base member body 31 is mounted to rear dropout portion 30 through hub axle 29a. Positioning projection 40e is used to set the rotational position of bracket bodies 40 and 41 relative to each other.

Second bracket body 41 has a stepped cross-sectional configuration such that second lower mounting portion 41b is laterally offset from second upper mounting portion 41a to form with the first lower mounting portion 40b of first bracket body 40 the space to receive second base member body 32 therein. Second upper mounting portion 41a includes a nut mounting member 46 forming a through-hole 41c and a positioning recess 41d facing the first upper mounting portion 40a of first bracket body. Through-hole 41c receives hub axle 29a and a portion of a nut member 39 therethrough, and positioning recess 41d mates with positioning projection 40e formed on the first upper mounting portion of first bracket body 40 to fix the rotational position of first bracket body 40 relative to second bracket body 41.

First lower mounting portion 40b of first bracket body 40 includes a screw hole 40f, and second lower mounting portion 41b includes a stepped through-hole 41e. A mounting shaft 50 having a head 50a with a hexagonal opening, a threaded portion 50b and a clip groove 50c for mounting an E-clip 58 passes through through-hole 41e and screws into screw hole 40f. Mounting shaft 50 fastens bracket bodies 40 and 41 together and rotatably supports second base member body 32 in a manner described below. A flat restricting face 40g is formed on the outer peripheral surface of the first lower mounting portion 40b of first bracket body 40 to determine the rotational position of second base member body 32 relative to first base member body 31.

Second base member body 32 has a tubular boss portion 32a rotatably supported on mounting shaft 50; an arm portion 32b extending radially outwardly from boss portion 32; a first rotation restricting projection 36a, which forms part of a first rotation restricting component of a first rotation restricting mechanism 36; and a second rotation restricting projection 37a, which forms a second rotation restricting component of a second rotation restricting mechanism 37. First rotation restricting mechanism 36 restricts rotational movement of second base member body 32 in the counterclockwise direction (direction of arrow B in FIG. 5), while second rotation restricting mechanism 37 restricts rotational movement of second base member body 32 in the clockwise direction (direction of arrow A in FIG. 5). A pair of link support portions 32c are formed at the distal end of arm portion 32b for installing link mechanism 35. An annular projection 32d is formed at a laterally outer location on the inner peripheral surface of boss portion 32a for swage-mounting a generally tubular bearing bushing 51. A tubular reinforcing member 53 is disposed between mounting shaft 50 and bearing bushing 51 for reinforcing first base member body 31. Reinforcing member 53 has a first end abutting a laterally inner location of second lower mounting portion 41b and a second end abutting the E-clip 58 mounted in the clip groove 50c formed in mounting shaft 50. As a result, even if the outside face of second lower mounting portion 41b should bump into a rock or tree, thereby subjecting the second lower mounting portion 41b to an outside force, that force will be received by reinforcing member 53, this making the second lower mounting portion 41b resistant to deformation. Reinforcing member 53 also isolates second base member body 32 from such forces, so it is possible also to reduce the likelihood of deformation of or damage to the second base member body 32.

A stopper plate 54 is disposed between E-clip 58 and a laterally inner location of boss portion 32a. Stopper plate 54 may be fabricated by press molding sheet metal, and it comprises a disk portion 54a and first and second projections 54b and 54c. Disk portion 54a has a stepped cross-sectional shape, and first and second projections 54b and 54c extend diametrically outward from disk portion 54a and bend in mutually opposite lateral directions. Reinforcing member 53 extends through a central opening formed in disk portion 54a. First projection 54b is formed such that it can be juxtaposed with the restricting face 40g formed on the first bracket body 40, and an adjusting screw 59 is screwed into this first projection 54b with the distal end of adjusting screw 59 contacting restricting face 40g. The rotational position of stopper plate 54, and hence second base member body 32, relative to first base member body 31 may be adjusted by turning adjusting screw 59. Second projection 54c is formed such that it can be juxtaposed (e.g., abut) with second rotation restricting projection 37a formed on second base member body 32.

A biasing mechanism in the form of a torsion coil spring 55 is mounted within boss portion 32a of second base member body 32 such that a first end of spring 55 is detained in a spring detent hole 32e formed in projection 32d and the other end of spring 55 is detained in a spring detent hole 54d formed in stopper plate 54. Spring 55 biases stopper plate 54 counterclockwise so that second projection 54c of stopper plate 54 abuts against second rotation restricting projection 37a. An O-ring 56 is mounted between the projection 32d of boss portion 32a and the second lower mounting portion 41b of second bracket body 41 for preventing liquids or foreign matter from penetrating into the cavity containing spring 55. A disk-shaped seal ring 57 is mounted between boss portion 32a and stopper plate 54 for the same purpose.

Figure 5:
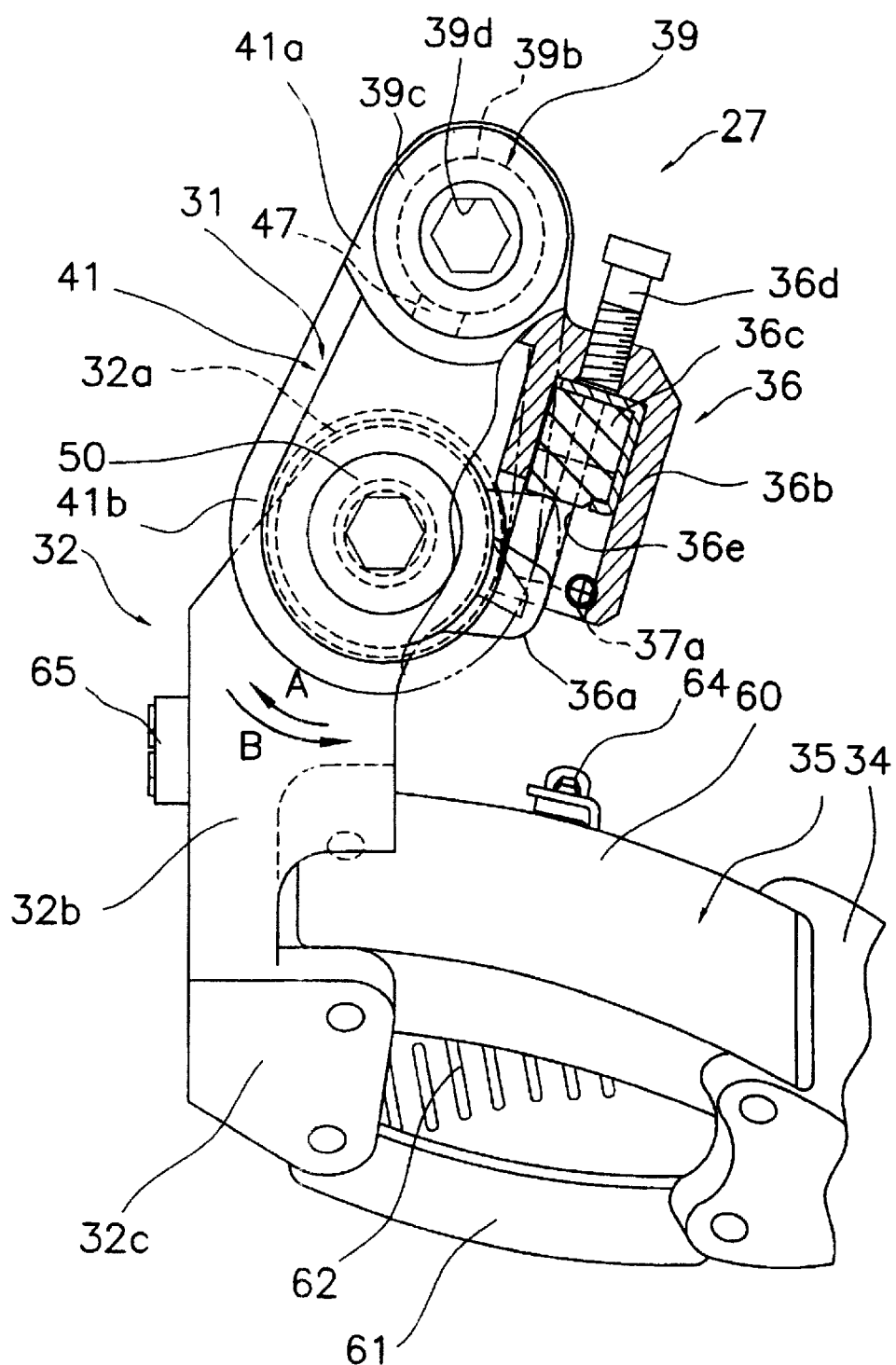
FIG. 5 is a partial cross sectional view of a rotation restricting mechanism for the rear derailleur.
Figure 6:
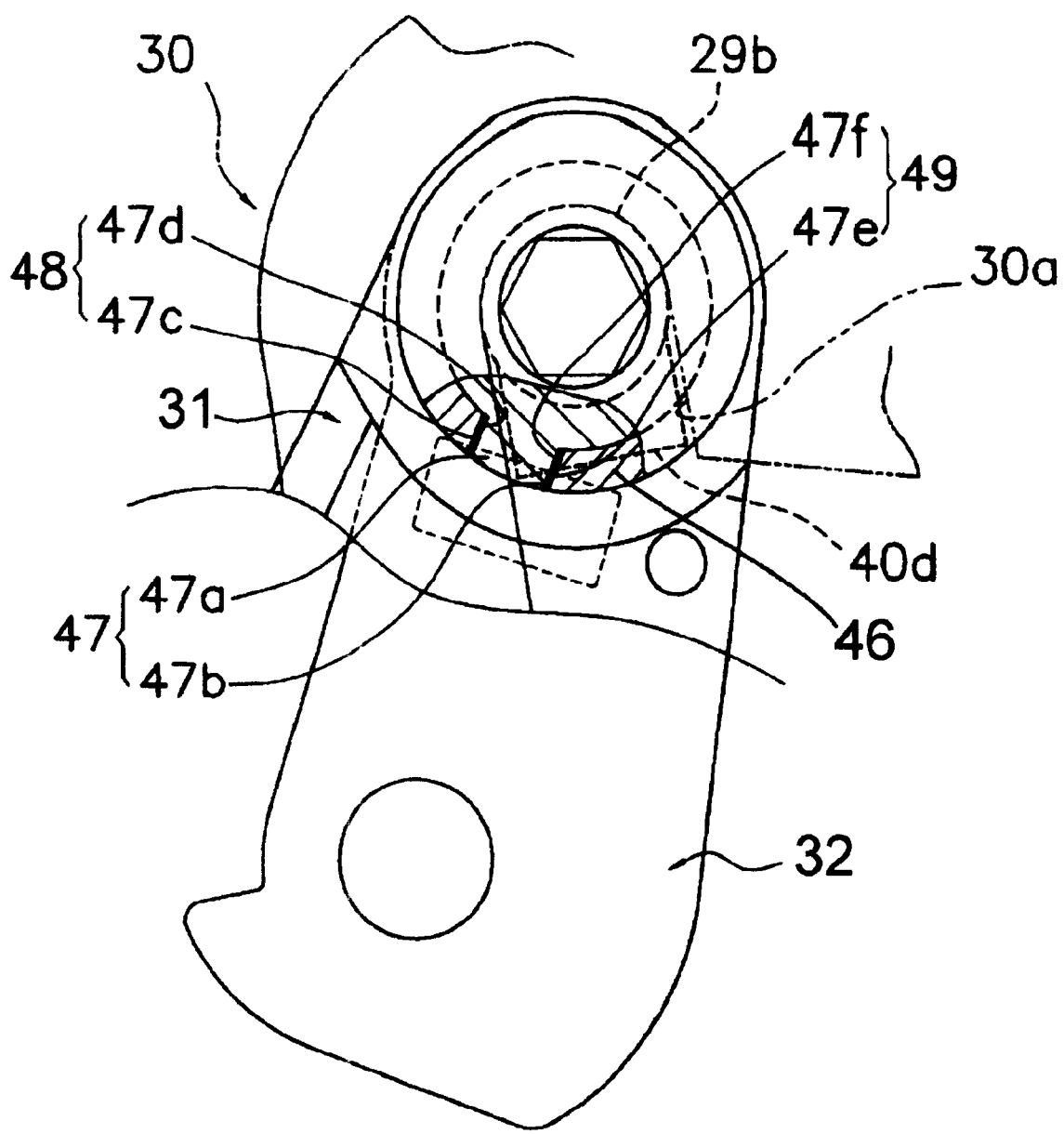
FIG. 6 is a partial cross sectional view of a rotation restricting mechanism for the base member.
Figure 7:
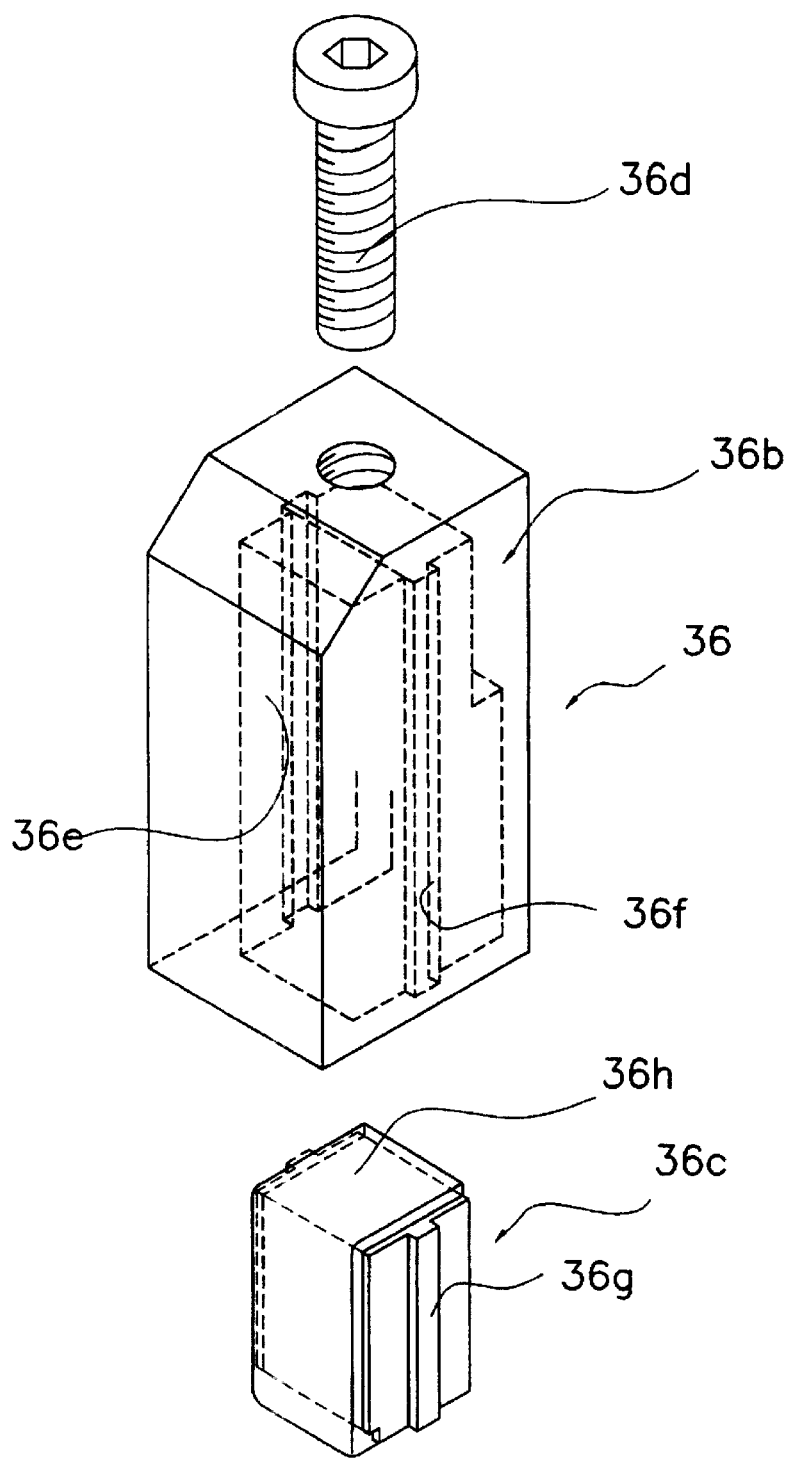
FIG. 7 is an exploded view of shock absorbing components for the rotation restricting mechanism for the derailleur.

As shown in FIGS. 3, 5 and 7, first rotation restricting mechanism 36 comprises the first restricting projection 36a on second base member body 32, a guide portion 36b integrally formed with second bracket body 41, a resilient shock absorber 36c, and an adjusting bolt 36d provided for adjusting the position of shock absorber 36c. Shock absorber 36c may be formed from a resilient material such as synthetic rubber, for example. Guide portion 36b has a generally rectangular shape and forms an internal rectangular guide space 36e with a guide grooves 36f on a pair of opposite walls. Shock absorber 36c has a pair of guide projections 36g on opposite walls for mating with guide grooves 36f. Cushion member 36c is retained within guide space 36e by a generally C-shaped metal retaining member 36h.

To use first rotation restricting mechanism 36, the adjusting bolt 36d is turned at a time when chain guide 33 and movable member 34 are not in contact with the chainstays 20 until first restricting projection 36a abuts cushion member 36c. As a result, first rotation restricting mechanism 36 restricts the rotational movement of second base member body 32 so that the chain guide 33 and moving member 34 do not contact the chainstays 20, even if second base member body 32 rotates counterclockwise.

Second rotation restricting mechanism 37 restricts rotational movement of second base member body 32 in the clockwise direction. Second rotation restricting mechanism 37 comprises the second restricting projection 37a on second base member body 32 and the second projection 54c on stopper plate 54. In the absence of tension on chain 10, stopper plate 54 turns counterclockwise under the biasing force of tension coil spring 55 until second restricting projection 37a abuts against second projection 54c, thus setting the rotational position of second base member body 32 relative to stopper plate 54.

Nut member 39 comprises a tubular shank 39b and a flange 39c projecting radially outwardly from an outer lateral side of shank 39b. Shank 39b has a female threaded portion 39a that screws onto hub axle 29a, and flange 39c has a hexagonal tool-engaging hole 39d for engaging an Allen key. A rotation restricting mechanism 47 is formed on nut member 39 and nut mounting member 46 for restricting rotation of nut member 39 relative to nut mounting member 46. As shown in FIGS. 3–6, rotation restricting mechanism 47 comprises a projection 47a formed on an inner lateral face 39e of flange 39c and a concavity 47b formed on an outer lateral face 46a of nut mounting member 46. A clockwise rotation restricting mechanism 48 is formed by a clockwise-facing abutment 47c formed on nut member 39 and a counterclockwise-facing abutment 47d formed on concavity 47b in nut mounting member 46. A counterclockwise rotation restricting mechanism 49 is formed by a counterclockwise-facing abutment 47e formed on nut member 39 and a clockwise-facing abutment 47f formed on concavity 47b in nut mounting member 46.

Chain guide 33 includes a pair of pulleys 33a and 33b, wherein chain 10 wraps around the front portion of pulley 33a and around the rear portion of pulley 33b. Chain guide 33 guides chain 10 onto selected ones of the plurality of sprockets G1–G8. Chain guide 33 is coupled to movable member 34 for pivoting around an axis substantially parallel to the hub axle 29a of rear hub 29. A coil spring 38 is installed between chain guide 33 and movable member 34 for biasing chain guide 33 clockwise (the direction of arrow C in FIG. 2) when viewed from the laterally outside. Such biasing, in conjunction with the clockwise bias of second base member body 32, imparts tension to the chain 10 so that chain 10 resists coming off of the gear cluster 28. Also, since second base member body 32 and chain guide 33 pivot during gearshift operations, the path of motion of chain guide 33 readily conforms to the radial profile of sprockets G1–G8 so that chain 10 may be guided smoothly onto any of the sprockets G1–G8.

Link mechanism 35 couples movable member 34 to second base member body 32 so that movable member 34 can move relative to second base member body 32. As shown in FIG. 2, link mechanism 35 comprises first and second link members 60 and 61 mounted at their first ends through a pair of pivot shafts 63 to a link support 32c disposed at the lower portion of second base member body 32. The second ends of first and second link members 60 and 61 are mounted to movable member 34 through another pair of pivot shafts 63. A coil spring 62 is connected to a pair of the pivot shafts 63 situated at opposite corners so that first and second link members 60 and 61 bias movable member 34 and chain guide 33 towards the large diameter sprocket G8. An inner wire mounting unit 64 is disposed at a side face of second link member 61 for fastening the inner wire 13a of shift cable assembly 13, and an outer casing mounting unit 65 is disposed on second base member body 32 in close proximity to boss portion 32a for fastening the outer casing 13b of shift cable assembly 13.

To mount derailleur 27 to the bicycle 1, the rear hub 29 first is mounted to the rear dropout portion 30 by placing hub axle 29a in mounting slot 30a. Then, first base member body 31 is placed over hub axle 29a by extending hub axle 29a through openings 40c and 41c in first bracket body 40 and second bracket body 41. Turnstop projection 40d on first bracket body 40 is fitted within mounting slot 30a of rear dropout portion 30, and positioning projection 40e on first bracket body 40 is fitted within positioning recess 41d of second bracket body 41, thereby fixing the rotational position of rear dropout portion 30, first bracket body 40 and second bracket body 41 relative to each other. A male threaded portion 29b of hub axle 29a then is screwed into the female threaded portion 39a of nut member 39. During this time, nut member 39 is pressed by hand against nut mounting member 46 so that projection 47a on nut member 39 engages concavity 47b in nut mounting member 46. As a result, nut member 39, first bracket body 40 and second bracket body 41 do not rotate while the male threaded portion 29b of hub axle 29a is threaded into the female threaded portion 39a of nut member 39. Rear derailleur 27 can be installed simply by rotating hub axle 29a, with the rotational position of rear derailleur relative to rear dropout portion 30 set merely by manually pressing nut member 39 laterally inward.

When riding the bicycle, the rear derailleur 27 may be operated by operating the corresponding shift control unit 23 to select an appropriate gear ratio in response to a change in riding conditions. Operating the shift control unit 23 causes the inner wire 13a to be pulled and released relative to the outer casing 13b, and the movement of inner wire 13a is transmitted to the first link member 60 via the inner wire mounting unit 64. The combination of the biasing force of spring 62 and the pulling and releasing force of inner wire 13a cause the first and second link members 60 and 61 to pivot around pivot shafts 63, chain guide 33 and base member 62 rotate to appropriate positions in accordance with the biasing force of springs 38 and 55, chain guide moves in the direction of the hub axle 29a, and chain 10 is guided by pulleys 33a and 33b onto the desired sprocket.

It is possible that the first base member body 31 or second base member body 32 may bump into a rock, tree, or the like during riding. However, since the second base member body 32 of derailleur 27 in this embodiment is supported at two lateral sides by first base member body 31, first base member body 31 and second base member body 32 are very rigid and resist damage and deformation. Additionally, since the first base member body 31 is also fastened to hub axle 29, which is more rigid than the distal ends of rear dropout portions 30, rear dropout portions 30 also are more resistant to damage and deformation. At the same time, the first rotation restricting mechanism 36 restricts counterclockwise rotation of second base member body 32, thus making it difficult for chain guide 33 to come into contact with the chainstays 20. Thus, damage and deformation of rear derailleur 27 can be avoided when traveling over rough terrain such as mountainous areas or other areas with dips and rises or obstacles.

Figure 8:
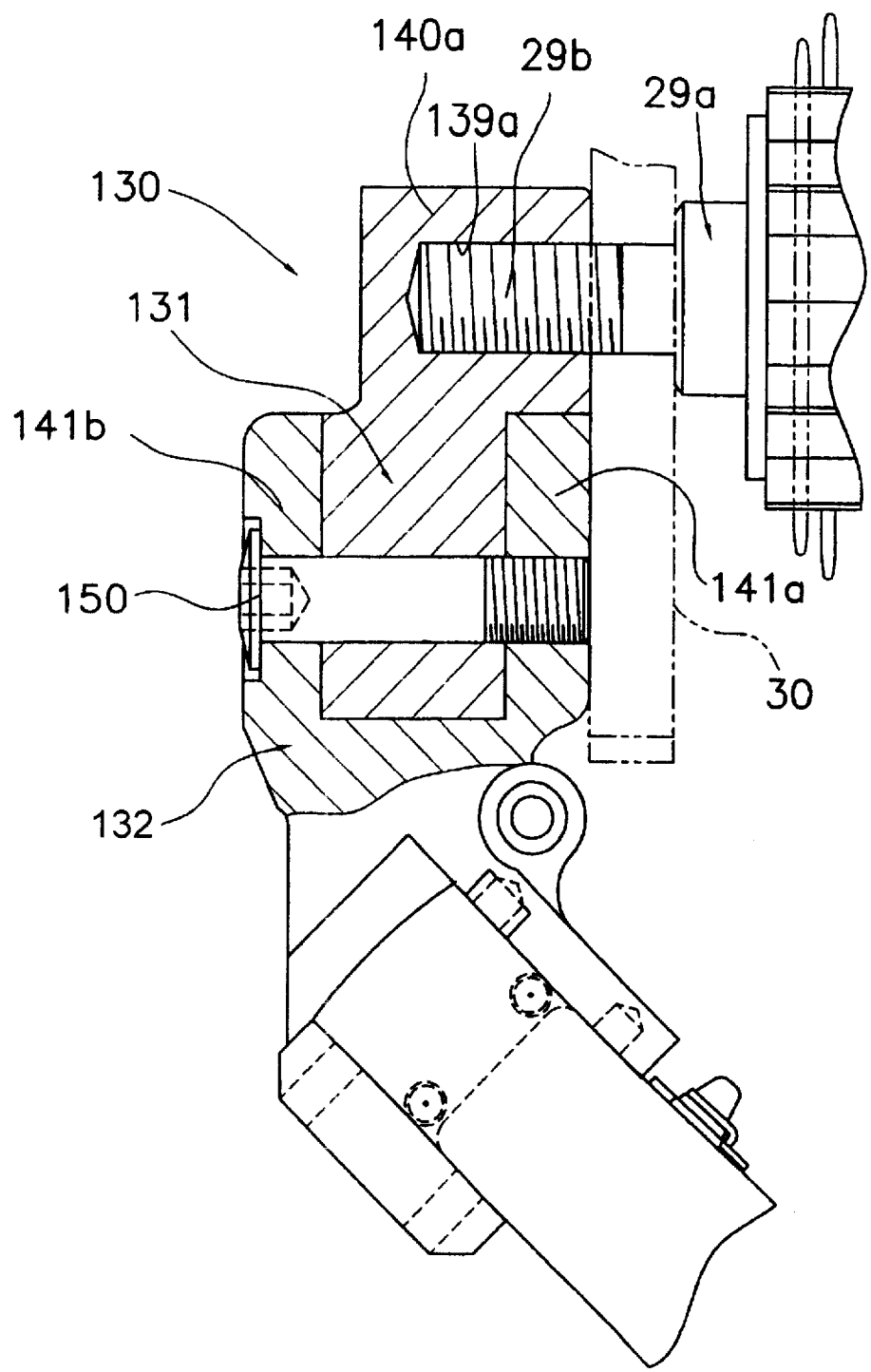
FIG. 8 is a partial cross sectional view of the components near the base member of an alternative embodiment of a rear derailleur in an assembled condition.

While the above is a description of various embodiments of inventive features, even further modifications may be employed without departing from the spirit and scope of the present invention. For example, as shown in FIG. 8, nut member 39 could be eliminated by forming a female-threaded portion 139a on an upper portion 140a of a unitary first base member body 131, wherein female-threaded portion 139a engages male threaded portion 29b of hub axle 29a so that first base member body 131 is fastened directly to rear dropout portion 30. In this embodiment, first base member body 131 is supported at opposite lateral sides by upper portions 141a and 141b of a second base member body 132 and nonrotatably fixed thereto by a mounting shaft 150.

In the first embodiment, rotation of the first base member 31 relative to rear dropout portion 30 was prevented by engaging the turnstop projection 40d with mounting slot 30a, but these structured are not required. While the described embodiments employed a base member comprising two base member bodies, the teachings herein could be applied to a conventional unitary base member. Also, the teachings herein could be applied to a conventional quick-release mechanism by screwing the threaded end of the quick-release rod into a nut member or a female-threaded base member.

While a nut member 39 with a circular shank 39b and a projection 47a was disclosed, rotation restriction between nut member 39 and nut mounting member 46 could be accomplished by forming shank 39b noncircular (e.g., square, hexagonal, or some other shape) and by forming through-hole 46a in nut mounting member 46 with a complementary shape.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature that is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A bicycle derailleur adapted to mount to a threaded shaft at a bicycle frame to mount the derailleur to the bicycle frame, wherein the derailleur comprises:
   a base member including an engagement member for nonrotatably engaging the bicycle frame;
   a threaded member coupled to the base member for engaging the threaded shaft at the bicycle frame;
   a chain guide; and
   a coupling mechanism coupled between the base member and the chain guide so that the chain guide moves relative to the base member;
   wherein a portion of the base member overlaps the threaded member when viewed perpendicular to the threaded shaft.

2. The derailleur according to claim 1 wherein the threaded member comprises a female threaded member.

3. The derailleur according to claim 1 wherein the engagement member comprises a projection that engages the bicycle frame.

4. The derailleur according to claim 3 wherein the bicycle frame includes a slot adapted to support a hub axle of a wheel hub therethrough, and wherein the projection is structured to engage the slot.

5. The derailleur according to claim 1 wherein the coupling mechanism comprises:
   a movable member that pivotably supports the chain guide; and
   a link mechanism adapted to be connected to a shift cable assembly so that the link mechanism moves in response to movement of the shift cable.

6. The derailleur according to claim 1 wherein the threaded member comprises a female threaded nut member.

7. A bicycle derailleur adapted to mount to a threaded shaft that fixes the derailleur to a bicycle frame, wherein the derailleur comprises:
   a base member including an engagement member for nonrotatably engaging the bicycle frame;
   a female threaded member coupled to the base member for engaging the threaded shaft;
   a chain guide; and
   a coupling mechanism coupled between the base member and the chain guide so that the chain guide moves relative to the base member;
   wherein a portion of the base member overlaps the threaded member when viewed perpendicular to the threaded shaft;
   wherein the bicycle frame is adapted to support a wheel hub having a threaded hub axle, and wherein the female threaded member is dimensioned to engage the hub axle.

8. A bicycle derailleur adapted to mount to a threaded shaft that fixes the derailleur to a bicycle frame, wherein the derailleur comprises:
   a base member including an engagement member for nonrotatably engaging the bicycle frame;
   a threaded member coupled to the base member for engaging the threaded shaft;
   wherein a portion of the base member overlaps the threaded member when viewed perpendicular to the threaded shaft;
   a chain guide; and a coupling mechanism coupled between the base member and the chain guide so that the chain guide moves relative to the base member, wherein the coupling mechanism comprises:
  a movable member that pivotably supports the chain guide; and
  a link mechanism adapted to be connected to a shift cable assembly so that the link mechanism moves in response to movement of the shift cable;
wherein the shift cable assembly comprises an inner wire that slides within an outer casing, and wherein the link mechanism comprises:
a first link member having a first end and a second end;
a second link member having a first end and a second end;
wherein the first end of the first link member is pivotably coupled to the base member;
wherein the second end of the first link member is pivotably coupled to the movable member;
wherein the first end of the second link member is pivotably coupled to the base member;
wherein the second end of the second link member is pivotably coupled to the movable member;
an inner wire mounting unit disposed on one of the first and second link members for mounting the inner wire of the shift cable assembly; and
a biasing member that biases the movable member relative to the base member.

9. A bicycle derailleur adapted to mount to a threaded shaft that fixes the derailleur to a bicycle frame, wherein the derailleur comprises:
  a base member including an engagement member for nonrotatably engaging the bicycle frame;
  a threaded member coupled to the base member for engaging the threaded shaft;
  a chain guide; and
  a coupling mechanism coupled between the base member and the chain guide so that the chain guide moves relative to the base member;
  wherein a portion of the base member overlaps the threaded member when viewed perpendicular to the threaded shaft;
  wherein the base member comprises:
    a first base member body adapted to be mounted to the frame;
    a second base member body rotatably supported by the first base member body; and
    wherein the second base member body is supported at first and second lateral locations, and wherein the first base member body supports at least one of the first and second lateral locations of the second base member body.

10. The derailleur according to claim 9 wherein the first base member body supports the first and second lateral locations of the second base member body.

11. The derailleur according to claim 10 further comprising a rotation restricting mechanism that restricts rotation of the second base member body relative to the first base member body.

12. The derailleur according to claim 11 wherein the rotation restricting mechanism comprises:
  a first rotation restricting component; and
  a second rotation restricting component;
  wherein the first rotation restricting component engages the second rotation restricting component to restrict counterclockwise rotation of the second base member body relative to the first base member body.

13. The derailleur according to claim 12 further comprising a biasing unit that biases the second base member body clockwise relative to the first base member body.

14. A bicycle derailleur adapted to mount to a threaded shaft that fixes the derailleur to a bicycle frame, wherein the derailleur comprises:
  a base member including an engagement member for nonrotatably engaging the bicycle frame;
  a female threaded nut member coupled to the base member for engaging the threaded shaft;
  a chain guide;
  a coupling mechanism coupled between the base member and the chain guide so that the chain guide moves relative to the base member;
  wherein a portion of the base member overlaps the nut member when viewed perpendicular to the threaded shaft;
  wherein the base member includes a nut mounting member, and
  a rotation restricting mechanism that restricts rotation of the nut member relative to the nut mounting member.

15. The derailleur according to claim 14 wherein the rotation restricting mechanism comprises a projection disposed on one of the nut member and the nut mounting member and a concavity disposed on the other one of the nut member and the nut mounting member, wherein the projection engages the concavity.

16. The derailleur according to claim 14 wherein the rotation restricting mechanism comprises:
  a first pair of abutments that restrict rotation of the nut member relative to the nut mounting member in one of a clockwise direction and a counterclockwise direction; and
  a second pair of abutments that restrict rotation of the nut member relative to the nut mounting member in the other one of the clockwise direction and the counterclockwise direction.

17. The derailleur according to claim 16 wherein the rotation restricting mechanism comprises a projection disposed on one of the nut member and the nut mounting member and a concavity disposed on the other one of the nut member and the nut mounting member, wherein the projection engages the concavity.

18. The derailleur according to claim 17 wherein the first pair of abutments and the second pair of abutments are formed by the projection and the concavity.

19. The derailleur according to claim 18 wherein the first pair of abutments are formed in part by a first circumferential face of the projection, and wherein the second pair of abutments are formed in part by a second circumferential face of the projection opposite the first circumferential face of the projection.

20. The derailleur according to claim 19 wherein the nut member is at least partially disposed in the nut mounting member.

* * * * *